United States Patent [19]

Schaulin

[11] Patent Number: 4,997,919
[45] Date of Patent: Mar. 5, 1991

[54] AZO DIRECT DYES CONTAINING A NON-REACTIVE TRIAZINYL MOIETY

[75] Inventor: Rudolf Schaulin, Riehen, Switzerland

[73] Assignee: Ciba-Geigy Corporation, Ardsley, N.Y.

[21] Appl. No.: 370,203

[22] Filed: Jun. 19, 1989

[30] Foreign Application Priority Data

Jun. 21, 1988 [CH] Switzerland .................. 2381/88

[51] Int. Cl.$^5$ .................. C09B 43/16; C09B 62/09; D06P 1/18; D06P 1/302
[52] U.S. Cl. .................. 534/637; 534/731; 534/754; 534/757; 534/796; 534/797; 534/845
[58] Field of Search ............. 534/797, 796, 637, 636, 534/635, 731, 754, 757

[56] References Cited

U.S. PATENT DOCUMENTS

| | | | |
|---|---|---|---|
| 3,945,990 | 3/1976 | Ikeda et al. | 534/797 |
| 4,542,208 | 9/1985 | Odani et al. | 534/797 |
| 4,605,442 | 8/1986 | Kawashita et al. | 106/22 |

FOREIGN PATENT DOCUMENTS

| | | | |
|---|---|---|---|
| 1525280 | 7/1969 | United Kingdom | 534/797 |
| 1544425 | 9/1978 | United Kingdom | 534/797 |
| 2036780 | 11/1979 | United Kingdom | 534/637 |

OTHER PUBLICATIONS

Chem. Abstr. 98:5565w (1983), Koho.

Primary Examiner—Floyd D. Higel
Attorney, Agent, or Firm—George R. Dohmann

[57] ABSTRACT

This invention relates to direct dyes for various substrates, in particular cellulosic fiber materials. The inventive dyes are high-temperature-resistant and highly suitable for the single bath, one step dyeing of polyester/cotton mixed fabrics with a disperse dye for the polyester fibers under the dyeing conditions for polyester fibers.

The inventive dyes are of the formula

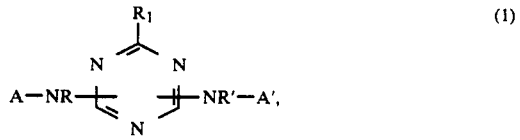

(1)

in which A is a radical of the formula

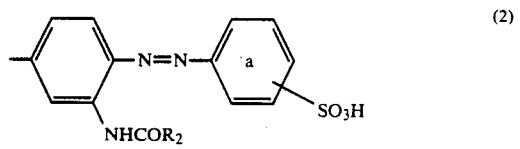

(2)

A' has the meaning of A or is a mono- or polyazo dye radical which is different from A, R and R', independently of one another, are hydrogen or $C_1$–$C_4$alkyl which is unsubstituted or substituted by chlorine, hydroxyl, cyano, carboxyl, sulfo, sulfato, methoxy, ethoxy, methoxycarbonyl or ethoxycarbonyl, $R_1$ is hydroxyl, $C_1$–$C_4$alkoxy, halogen, $C_1$–$C_4$alkylthio, amino, N-mono- or N,N-di-$C_1$–$C_4$alkylamino which is unsubstituted or substituted in the alkyl moiety by hydroxyl, carboxyl or $C_1$–$C_4$alkoxy, cyclohexylamino, phenylamino or N-$C_1$–$C_4$alkyl-N-phenylamino which are unsubstituted or substituted in the phenyl moiety by $C_1$–$C_4$alkyl, $C_1$–$C_4$alkoxy, carboxyl, sulfo or halogen, morpholino, piperidino or 3-carboxy- or 3-carboxamidopyridin-1-yl, $R_2$ is unsubstituted or hydroxy-substituted $C_1$–$C_4$alkyl, and the phenyl radical (a) is unsubstituted or substituted by $C_1$–$C_4$alkyl, $C_1$–$C_4$alkoxy, halogen, hydroxyl, carboxyl, sulfo, —$NHCOR_2$ or unsubstituted or sulfo-, $C_1$–$C_4$alkoxy-, hydroxyl- or halogen-substituted phenylazo or 1-2-naphthylazo.

13 Claims, No Drawings

AZO DIRECT DYES CONTAINING A NON-REACTIVE TRIAZINYL MOIETY

The present invention relates to novel azo dyes, processes for their preparation and their use for the dyeing and printing of fibre materials, in particular of textile fibre materials. The present invention relates to compounds of the formula

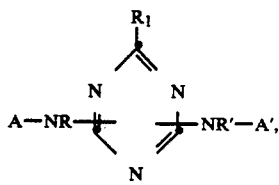

in which A is a radical of the formula

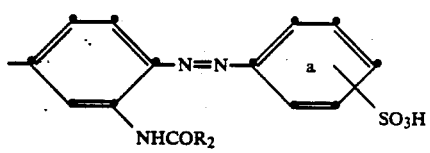

A' has the meaning of A or is a radical of a mono- or polyazo dye different from A, R and R', independently of one another, are hydrogen or substituted or unsubstituted $C_1-C_4$ alkyl, $R_1$ is a substituent, $R_2$ is substituted or unsubstituted $C_1-C_4$ alkyl and the phenyl radical (a) is unsubstituted or further substituted.

The substituents R and R', which are identical or different from one another, have the meaning hydrogen or $C_1-C_4$ alkyl which is unsubstituted or substituted, for example, by chlorine, hydroxyl, cyano, carboxyl, sulfo, sulfato, methoxy, ethoxy, methoxycarbonyl or ethoxycarbonyl. The meaning sulfo in general comprises the form of the free acid ($-SO_3H$) and also the salt form, suitable salts being in particular alkali metal salts (Li, Na, K) or ammonium salts.

Examples of suitable substituents R and R' are: $C_1-C_4$ alkyl, which in general comprises methyl, ethyl, n- or isopropyl, or n-, iso-, sec- or tert-butyl; carboxymethyl, β-carboxyethyl, methoxycarbonylmethyl, ethoxycarbonylmethyl, β-methoxyethyl, β-ethoxyethyl, β-chloroethyl, γ-chloropropyl, β-hydroxyethyl, β-hydroxybutyl, β-cyanoethyl, sulfomethyl, β-sulfoethyl and β-sulfatoethyl.

R and R', independently of one another, are preferably methyl or ethyl and particularly preferably are each hydrogen.

The substituent $R_1$ has, for example, the meaning hydroxyl, $C_1-C_4$ alkoxy, which in general is understood to mean methoxy, ethoxy, n-or isopropoxy or n-, iso-, sec- or tert-butoxy, halogen, for example bromine and in particular chlorine, $C_1-C_4$ alkylthio, amino, N-mono- or N, N-di-$C_1-C_4$ alkylamino which is unsubstituted or substituted in the alkyl moiety by hydroxyl, carboxyl or $C_1-C_4$ alkoxy, cyclohexylamino, phenylamino or N-$C_1-C_4$ alkyl-N-phenylamino which is unsubstituted or substituted in the phenyl moiety by $C_1-C_4$ alkyl, $C_1-C_4$ alkoxy, carboxyl, sulfo and/or halogen, morpholino, piperidino or 3-carboxy- or 3-carboxamidopyridin-1-yl.

Examples of suitable substituents $R_1$ are thus hydroxyl, methoxy, ethoxy, n- or isopropoxy, chlorine, ethylthio, amino, methylamino, ethylamino, carboxymethylamino, β-hydroxyethylamino, N, N-di-β-hydroxyethylamino, β- sulfoethylamino, cyclohexylamino, o-, m- or p-methylphenylamino, o-, m- or p-methoxyphenylamino, o-, m- or p-chlorophenylamino, o-, m- or p-sulfophenylamino, 2, 4- or 2, 5-disulfophenylamino, o-carboxyphenylamino, N-ethyl-N-phenylamino, N-methyl-N-phenylamino, morpholino, piperidino. 3-carboxypyridin-1-yl or 3-carboxamidopyridin-1-yl.

$R_1$ is preferably N-mono- or N, N-di-$C_1-C_4$ alkylamino which is unsubstituted or substituted in the alkyl moiety by hydroxyl, carboxyl, methoxy or ethoxy, phenylamino which is unsubstituted or substituted in the phenyl moiety by chlorine, methyl, methoxy and/or sulfo, N-$C_1-C_4$ alkyl-N-phenylamino, $C_1-C_4$ alkylthio, chlorine, morpholino or piperidino.

Particularly preferably, $R_1$ is an N-mono- or N, N-di-$C_1-C_4$ alkylamino radical which is unsubstituted or substituted in the alkyl moiety by hydroxyl, methoxy or ethoxy. Compounds of the formula (1) in which $R_1$ is morpholino are also of interest.

A particularly preferred embodiment of the present invention relates to compounds of the abovementioned formula (1) in which $R_1$ is an N-hydroxy-$C_1-C_2$ or N, N-dihydroxy-$C_1-C_2$ alkylamino radical and is in particular an N, N-di-β-hydroxyethylamino radical.

$R_2$ in the radical of the formula (2) is, for example, a $C_1-C_4$ alkyl radical which is unsubstituted or substituted, for example, by hydroxyl and preferably a $C_1-C_3$ alkyl radical which is unsubstituted or substituted by hydroxyl. Examples of suitable substituents $R_2$ are methyl, ethyl, nor isopropyl, hydroxymethyl, β-hydroxyethyl, γ-hydroxypropyl, the meanings methyl and hydroxymethyl being particularly preferred.

The phenyl radical (a) can be further substituted, for example, by one or more identical or different substituents selected from the group consisting of $C_1-C_4$ alkyl, $C_1-C_4$ alkoxy, halogen, hydroxyl, carboxyl, sulfo, $-NHCOR_2$, where $R_2$ is as defined above, and arylazo.

Suitable arylazo substituents on the phenyl radical (a) are, for example, a 1- or 2-naphthylazo radical or preferably a phenylazo radical, it being possible for each of the radicals mentioned to be unsubstituted or further substituted, for example, by sulfo, $C_1-C_4$ alkyl, $C_1-C_4$ alkoxy, hydroxyl and/or halogen. A phenyl radical (a) substituted by an arylazo radical is preferably a phenylazo radical which is unsubstituted or substituted by sulfo, methyl, methoxy and/or chlorine.

Preferably, the phenyl radical (a) does not carry any further substituents or is further substituted by one or more substituents selected from the group consisting of $C_1-C_4$ alkyl, $C_1-C_4$ alkoxy, halogen, hydroxyl and carboxyl. Particularly preferably, the phenyl radical (a) does not carry any further substituents or is further substituted by a single methyl, methoxy or chlorine substituent.

A' as a radical of a mono- or polyazo dye different from A can have, for example, the formula $$[-D-N=N(M-N=N-)_pK] \tag{3}.$$

in which D is the radical of a diazo component of the benzene or naphthalene series, M is a middle component of the benzene series, K is a coupling component of the benzene or naphthalene series or of the heterocyclic series and p is 0, 1 or 2.

Thus, A' can be, for example, a radical of the formula

—D—N=N—(M—N=N—)$_p$K  (3a) or

—K(—N=N—M)$_p$N=N—D  (3b), in which D, K, M and p are each as defined above.

In the formulae (3), (3a) and (3b), p is preferably the number 1 and particularly preferably the number 0.

If K in formula (3) is a radical of the heterocyclic series, it can be, for example, a 1-phenylpyrazolonyl or pyridonyl radical.

The radicals D, K and M can contain the customary substituents bound to their basic structure.

Examples of suitable substituents on the radical D, K or M are: $C_1$–$C_4$ alkyl, $C_1$–$C_4$ alkoxy; $C_1$–$C_4$ alkoxy-$C_1$–$C_4$ alkyl, for example methoxymethyl, ethoxymethyl, n-propoxymethyl, isopropoxymethyl, n-butoxymethyl, ethoxyethyl, n-butoxyethyl, qthoxypropyl, butoxypropyl or methoxybutyl; the radical —NHCOR$_2$ in which R$_2$ is as defined above, for example acetylamino, propionylamino or hydroxymethylamino; benzoylamino; amino; N-mono- or N, N-di-$C_1$–$C_4$ alkylamino which is unsubstituted or substituted in the alkyl moiety by —OH, —OCOCH$_3$, —OSO$_3$H, —CN or halogen, for example methylamino, ethylamino, n- or isopropylamino, n-, sec- or tert-butylamino, N, N-di-β-hydroxyethylamino, N, N-di-β-sulfatoethylamino, hydroxypropylamino, β-sulfatoethylamino, β-chloroethylamino, β-acetyloxyethylamino; phenylamino; mono- or disulfobenzylamino; $C_1$–$C_4$ alkoxycarbonyl, for example methoxy- or ethoxycarbonyl; $C_1$–$C_4$ alkylsulfonyl, for example methyl- or ethylsulfonyl; phenylsulfonyloxy; trifluoromethyl; nitro; cyano; halogen, which is in general understood to mean fluorine, chlorine and bromine; carbamoyl; N-mono- or N, N-di-$C_1$–$C_4$ alkylcarbamoyl; sulfamoyl; N-mono- or N, N-di-$C_1$–$C_4$ alkylsulfamoyl; N-(β-hydroxyethyl)sulfamoyl; N, N-di-(β-hydroxyethyl)sulfamoyl; N-phenylsulfamoyl; hydroxyl; carboxyl; sulfo; sulfomethyl; ureido.

D is preferably phenyl which is unsubstituted or substituted by methyl, ethyl, methoxy, ethoxy, sulfo, chlorine, hydroxyl and/or carboxyl or is 1- or 2-naphthyl which is unsubstituted or substituted by sulfo, phenylsulfonyloxy and/or hydroxyl.

M is preferably a 1, 3- or 1, 4-phenylene radical which is unsubstituted or substituted by sulfo, methyl, ethyl, methoxy and/or ethoxy.

K is preferably a phenyl radical which is unsubstituted or substituted by methyl, ethyl, methoxy, ethoxy, sulfo, hydroxyl, chlorine, amino and/or the radical —NHCOR$_2$, in which R$_2$ has the abovementioned meanings and preferences, a 1- or 2-naphthyl radical which is unsubstituted or substituted by sulfo and/or hydroxyl, a pyridonyl radical which is unsubstituted or substituted by hydroxyl, $C_1$–$C_4$ alkyl, $C_1$–$C_4$ alkoxy-$C_1$–$C_4$-alkyl, carbamoyl, radical which is unsubstituted or substituted by $C_1$–$C_4$ alkyl, $C_1$–$C_4$ alkyl, $C_1$–$C_4$ alkoxy, chlorine, sulfo and/or carboxyl. If A' is a radical of a mono- or polyazo dye which is different from A, this dye can have any desired colour, for example a red, orange, blue, violet, green and preferably a yellow colour.

A' is particularly preferably the radical of a yellow dye of the formula

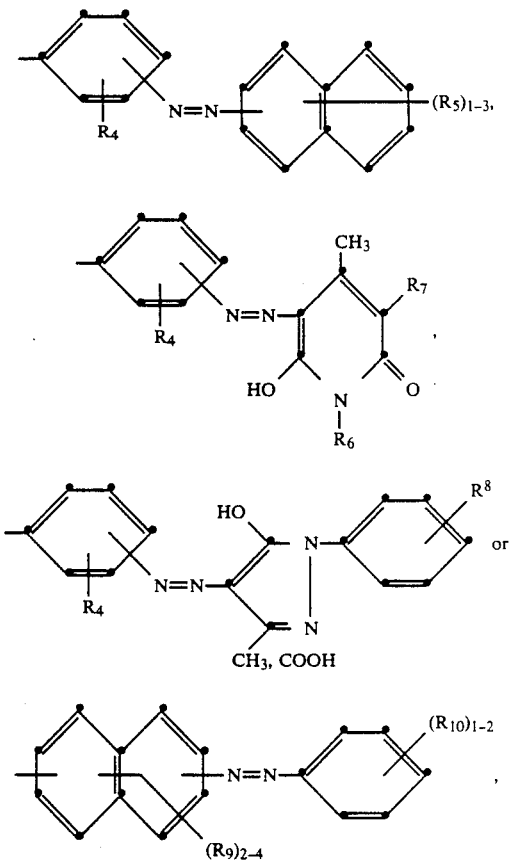

in which R$_4$ is hydrogen, methyl, methoxy, sulfo, chlorine, acetylamino, hydroxymethylamino, propionylamino or carboxyl, R$_5$ has the meaning of 1 to 3 identical or different radicals selected from the group consisting of sulfo, methyl, methoxy, chlorine, hydroxyl, carboxyl and o-, m- or p-sulfophenylazo, R$_6$ is hydrogen, $C_1$–$C_4$ alkyl or $C_1$–$C_4$ alkoxy-$C_1$–$C_4$ -alkyl, R$_7$ is sulfomethyl, cyano or carbamoyl, R$_8$ is methyl, methoxy, chlorine, sulfo or carboxyl, R$_9$ has the meaning of 2 to 4 identical or different substituents selected from the group consisting of hydroxyl and sulfo and R$_{10}$ has the meaning of 1 or 2 identical or different radicals selected from the group consisting of hydrogen, methyl, methoxy, sulfo, hydroxyl, amino, acetylamino and hydroxyacetylamino.

A preferred embodiment of the present invention relates to compounds of the formula

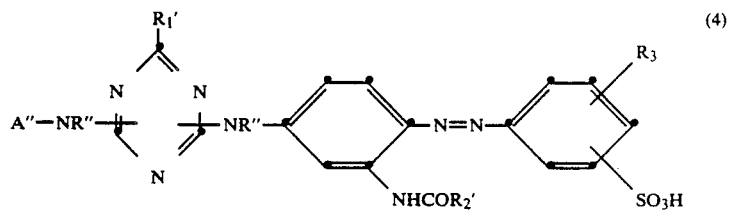

(4)

in which R$_1'$ is chlorine, corpholino, piperidino, $C_1$–$C_4$ alkylthio, N-$C_1$–$C_4$ alkyl-N-phenylamino, phenylamino which is unsubstituted or substituted by chlorine, methyl, methoxy and/or sulfo, N-mono- or N, N-di-$C_1$-$C_4$ alkylamino which is unsubstituted or substituted in the alkyl moiety by hydroxyl, carboxyl, methoxy or ethoxy, $R_2'$ is $C_1$-$C_3$ alkyl which is unsubstituted or substituted by hydroxyl, $R_3$ is hydrogen, $C_1$-$C_4$ alkyl, $C_1$-$C_4$ alkoxy, halogen, hydroxyl or carboxyl, $R''$ is hydrogen, methyl or ethyl and $A''$ is a radical of the formula

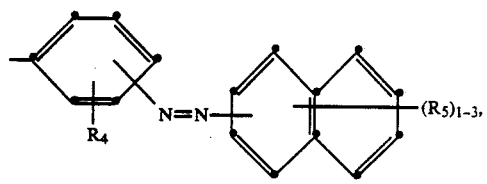

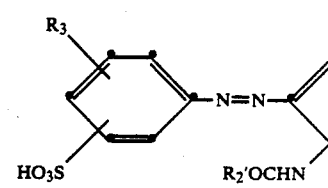

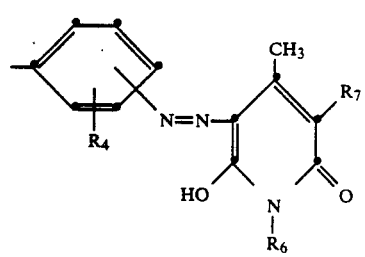

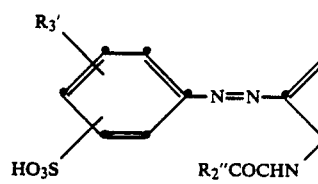

in which $R_4$ is hydrogen, methyl, methoxy, sulfo, chlorine, acetylamino, hydroxymethylamino, propionylamino or carboxyl, $R_5$ has the meaning of 1 to 3 identical or different radicals selected from the group consisting of sulfo, methyl, methoxy, chlorine, hydroxyl, carboxyl and o-, m- or p-sulfophenylazo, $R_6$ is hydrogen, $C_1$-$C_4$ alkyl or $C_1$-$C_4$ alkoxy-$C_1$-$C_4$ alkyl, $R_7$ is sulfomethyl, cyano or carbamoyl, $R_8$ is methyl, methoxy, chlorine, sulfo or carboxyl, $R_9$ has the meaning of 2 to 4 identical or different substituents selected from the group consisting of hydroxyl and sulfo and $R_{10}$ has the meaning of 1 or 2 identical or different radicals selected from the group consisting of hydrogen, methyl, methoxy, sulfo, hydroxyl, amino, acetylamino and hydroxyacetylamino.

A further group of particularly useful dyes are the compounds of the abovementioned formula (1) in which A and A' are identical radicals of the abovementioned formula (2).

A particularly preferred embodiment of the present invention accordingly relates to compounds of the formula

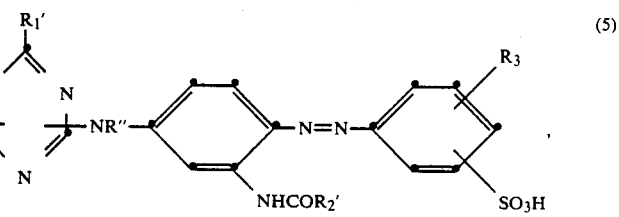 (5)

in which $R''$, $R_1'$ and $R_3$ are each as defined in formula (4). Of these, the compounds of the abovementioned formula (5) in which $R_1^{40}$ is morpholino, N-hydroxy-$C_1$-$C_2$ alkylamino or N, N-dihydroxy-$C_1$-$C_2$ is $R_2^{40}$ is methyl, ethyl or hydroxymethyl, $R''$ is hydrogen and $R_3$ is hydrogen, methyl, methoxy or chlorine are of very particular interest.

Especially good coloristic results are obtained with compounds of the formula

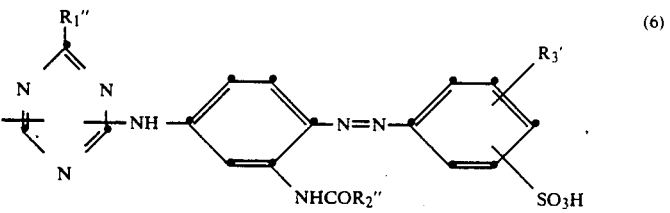 (6)

in which $R_1^{41}$ N, N-di-$\beta$-hydroxyethylamino or morpholino, $R_1^{41}$ is methyl or hydroxymethyl and $R_3^{40}$ hydrogen, methyl or methoxy.

The process for the preparation of the compounds of the formula (1) comprises reacting a triazine compound of the formula

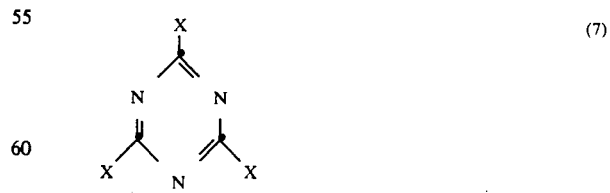 (7)

successively in any desired sequence with a compound of the formula

A'—NHR' (8)

a compound of the formula

A—NHR (8a)

and a compound of the formula

R₁—H (9)

to give the compound of the formula (1), A, A', R, R' and R₁ each having the abovementioned meanings and preferences and X is halogen, in particular chlorine.

The starting compounds of the formulae (7), (8), (8a) and (9) are known per se or can be obtained in a manner known per se.

Preferably, the trihalogenotriazine compound of the formula (7) is first reacted with approximately stoichiometric amounts of an aminoazo compound of the formula (8) at a temperature of $-5°$ to 20° C., preferably 0 to 5° C, during which the pH is maintained in a neutral to slightly acidic range, preferably at 5 to 6, by the addition of suitable bases, for example ammonium bases or alkali metal bases such as ammonia, lithium hydroxide, sodium hydroxide, potassium hydroxide or lithium carbonate, sodium carbonate or potassium carbonate. Approximately stoichiometric amounts of an aminoazo compound of the formula (8a) are advantageously added to the reaction mixture obtained, and this mixture is reacted with the triazine derivative at a slightly elevated temperature, preferably at 30° to 50° C. and a neutral to slightly acidic pH, which is preferably 6 to 6.5. If the compounds of the formula (8) and (8a) are identical aminoazo compounds, about 2 equivalents of this aminoazo dye are reacted with 1 equivalent of the triazine compound, during which the temperature is preferably first maintained at $-5°$ to 20° C. and then increased to about 30° to 50° C.

A further possibility consists in reacting the triazine compound of the formula (7) with a mixture which contains not only a compound of the formula (8) but also a compound of the formula (8a) which is different therefrom, which gives a mixture of an asymmetrical compound of the formula

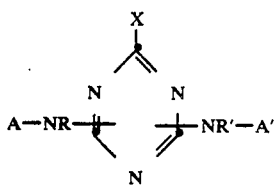

and two symmetrical compounds of the formulae

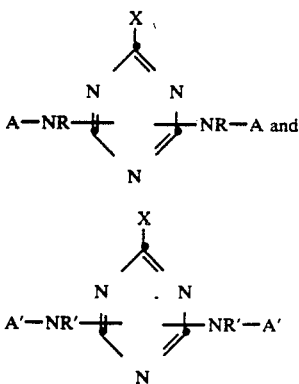

The triazinyl dye thus obtained still contains a halogen atom X, which can be converted by reaction with a compound of the formula (9) at elevated temperature, preferably 70° to 100° C., and a neutral to slightly alkaline pH, which, depending on the compound of the formula (9) used, is, for example, 7 to 9, into any desired group R₁.

The present invention further relates to the use of the azo dyes of the formula (1), if appropriate also mixtures of these compounds, for the dyeing or printing of nitrogen-containing and in particular of hydroxyl-containing fibre materials.

This means that the azo dyes of the formula (1) according to the invention are suitable for the dyeing and printing of nitrogen-containing or in particular of cellulosic fibre materials, preferably of textile fibre materials, made of silk, wool or synthetic polyamides, and preferably made of cellulosic fibres, such as rayon, cotton or hemp.

With respect to their coloristic properties, they can be designated as direct dyeing dyes or simply C.I. direct dyes. It is also possible to dye textile fibre materials made of mixed fibres, for example wool/cotton, polyamide/cotton, polyacrylic/cotton or in particular polyester/cotton mixed fibres by single-bath dyeing processes and in the presence of dyes for the other fibre types involved.

The textile fibre materials can be present in a wide range of processing stages, for example as fibre, yarn, woven or knitted fabrics.

In addition to textile substrates, it is also possible to dye leather and paper with the compounds (dyes) of the formula (1) according to the invention.

They give level dyeings in yellow hues having good general fastness properties, in particular good rub, wet, wet-rub, perspiration and light fastness properties. If necessary, the wet fastness properties, in particular wash fastness, of the direct dyeings and prints obtained can still be improved significantly by an aftertreatment with so-called fixing agents.

The dyes of the formula (1) according to the invention can be readily used together with other dyes, in particular disperse dyes. The dyes according to the invention have sufficient high-temperature stability and can therefore be used for the dyeing from an aqueous liquor and at a pH of 4 to 7.5, preferably 5 to 7, under the dyeing conditions for polyester fibres, that is to say, at temperatures in the range of about 100° to 150° C., preferably 110° to 130° C.

Thus, it is possible to use conventional disperse dyes together with the dyes of the formula (1) according to the invention in a one-stage single-bath process for the dyeing of polyester/cotton mixed fibres (mixed fabric), in which on both types of fibres uniform dyeings which have good fastness properties are obtained by means of the respective dyes. If a disperse dye is used which gives the same shade as the dye according to the invention, it is also possible to obtain solid dyeings.

By providing the dyes of the formula (1) according to the invention, the dyeing of textile mixed fibres (mixed fabrics), for example those made of polyester and cellulose fibres, is greatly simplified. Thus, it is no longer necessary to carry out the dyeing customary per se of each type of fibre of a fibre mixture in a separate process and using different dyeing conditions.

The compounds of the formula (1) according to the invention are also suitable for the preparation of aqueous inks for the ink-jet printing.

The examples which follow serve to illustrate the invention. Parts and percentages are by weight, unless stated otherwise. Parts by weight relate to parts by volume as the kilogram relates to liter. Temperatures are given in degrees Celsius.

EXAMPLE 1

17.3 parts of 1-aminobenzene-3-sulfonic acid are suspended in 200 parts of an ice/water mixture and 33 parts of concentrated HCl and diazotized at 0° to 5° C with 6.95 parts of sodium nitrite, dissolved in 20 parts of water. Excess nitrite is then destroyed by means of sulfamic acid. The solution of the diazo compound thus prepared is then added dropwise over a period of 30 minutes to a solution of 16.6 parts of 3-(hydroxyacetylamino)aniline in 100 parts of dimethylformamide and 300 parts of water at 5°–10° C., during which the pH is maintained at 5.0 to 5.5 by the addition of sodium acetate. Stirring is continued for 1 hour, and the aminoazo dye is then filtered off; it is then washed with 20 % sodium chloride solution and dried.

21.4 parts of the crude aminoazo compound (corresponding to 14.3 parts of pure aminoazo compound) thus obtained are dissolved at pH 7 in 300 parts of water, cooled to about 5° C. and then added to a suspension of 3.7 parts of cyanuric chloride in 100 parts of an ice/water mixture. The mixture is stirred at 0–°5° C. for 3 hours, then warmed to 40° C. over a period of 1 hour and then stirred at 40° to 50° C. for another 4 hours, the pH during the entire time of stirring being maintained at 6 by the addition of sodium hydroxide solution. After the addition of 50 ml of ethanol, the product is salted out with sodium chloride, filtered off and washed with sodium chloride solution. The moist filtered material is dissolved in warm water and then salted out, filtered off, washed with sodium chloride solution and finally dried. This gives the dye which in the form of the free acid has the formula

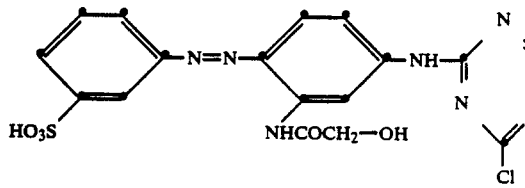

It dyes cotton as a direct dye in pure greenish-yellow shades, and the dyeings obtained have good light and wet fastness properties. The dye is also suitable for the dyeing of leather and paper ($\lambda_{max}$ 382 nm).

EXAMPLE 2

Analogously to Example 1, 18.7 parts of 4-aminotoluene-2sulfonic acid are diazotized and coupled onto 3-(hydroxyacetylamino)aniline.

20 parts of the crude aminoazo dye (about 78 % pure) obtained are then condensed analogously to Example 1 with 3.9 parts of cyanuric chloride and isolated while moist.

The moist filter material is stirred with 4.2 parts of diethanolamine in 200 parts of water at 90°–95° C. for 6 hours. 200 parts of ethanol are added to the viscous suspension, and the product is then salted out, filtered off and dried. This gives a dye which in the form of the free acid has the formula

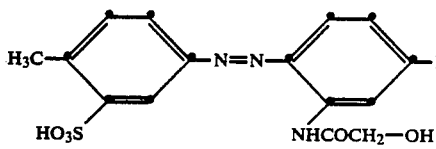 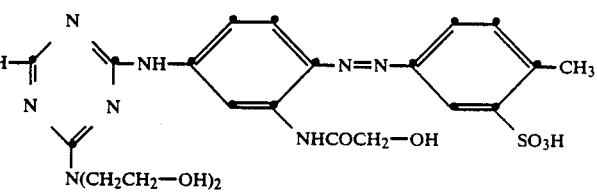

It dyes cotton, preferably by the exhaustion process at 90° C. or 130° C. (HT conditions), in pure yellow shades, the dyeings obtained having good light and wet fastness properties ($\lambda_{max}$ 405 nm).

EXAMPLE 3

5.5 parts of cyanuric chloride are dissolved in 50 parts of acetone, and 300 parts of an ice/water mixture are then added. A solution of 9.2 parts of the aminoazo dye of the formula

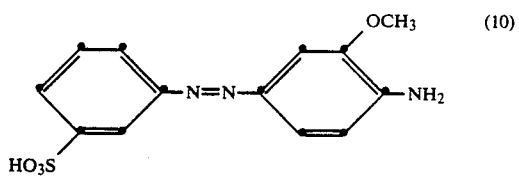

(10)

in 200 parts of water are then added at pH 7. The mixture is then stirred at 0°–5° C. for 3 hours, during which the pH is maintained at 6.0 by the addition of sodium hydroxide solution. 10.9 parts of the aminoazo dye of the formula

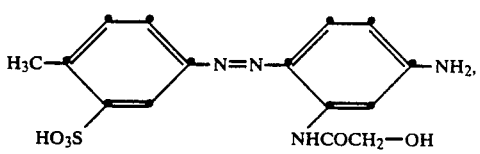

dissolved in 200 parts of water, are then added at pH 7 to the reaction mixture. This mixture is stirred at a temperature of 40° to 45° C. for 6 hours, and the pH is maintained at 7.0 by the addition of sodium solution. 6.5 parts of diethanolamine are then added, and the reaction mixture is heated to about 90° C. It is stirred at 90° C. for 6 hours, then cooled to 40° C., and the dye is precipitated by means of sodium chloride and ethanol. The product is filtered off, again dissolved in hot water, the solution is clarified and, after the addition of about by volume ethanol, the product is precipitated. The dye is filtered off, washed with sodium chloride solution and dried; in the form of the free acid, it has the formula

EXAMPLES 4–10

The procedure as described in Example 3 is repeated,

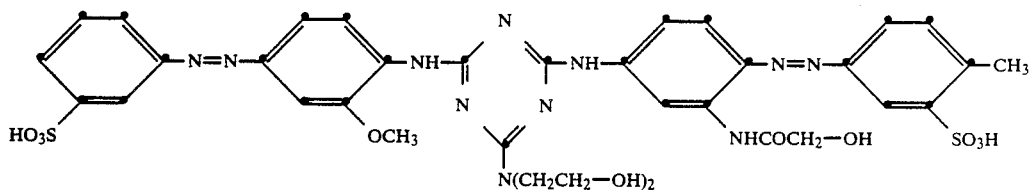

The dye dyes cotton in pure yellow shades, and the dyeings obtained have good light and wet fastness properties ($\lambda_{max}$ 402 nm).

except that instead of the aminoazo dye of the formula (10) an equivalent amount of one of the dyes listed in the table below is used, to give also valuable dyes which dye cotton in a yellow shade having good general fastness properties:

TABLE

| Example | Aminoazo dye |
|---|---|
| 4 | |
| 5 | |
| 6 | |
| 7 | |
| 8 | |
| 9 | |

TABLE-continued

| Example | Aminoazo dye |
|---|---|
| 10 | 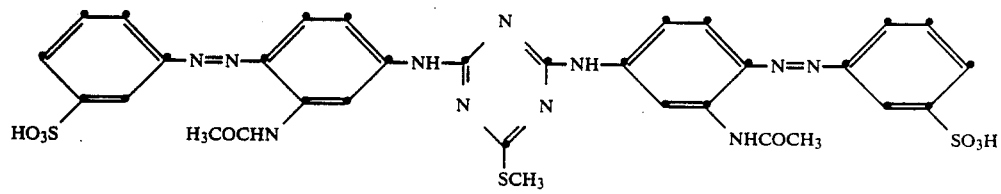 |

EXAMPLE 11

19.2 parts of the dye obtained according to Example 1 (salt content about 37% are stirred in 200 parts of water. After the addition of 2.0 parts of morpholine, the reaction mixture is heated and stirred at 90° C. for 4 hours, during which the pH of the reaction mixture is maintained above 7.5 by the addition of 1N sodium hydroxide solution. The reaction mixture is then cooled to about 70° C., 30 parts of ethanol are added and the product is salted out. After it is filtered off, the filter material is washed with sodium chloride solution and then dried. This gives a dye which in the form of the free acid has the formula amino-2-acetylaminoazobenzene-3'-sulfonic acid (sodium salt) in 800 parts of water are added to this suspension. While maintaining the pH at 6.5 by means of 1N sodium hydroxide solution, the mixture is first stirred at 0° to 5° C for 1 hour, then at 10° to 15° C. for 1 hour, and subsequently at 30° to 40° C. for 6 hours, at 60° to 70° C. for 2 hours and finally at 85° C. for 4 hours. After cooling the mixture to about 60° C., 100 parts of ethanol are added, and the dye is then salted out with sodium chloride, filtered off and washed with sodium chloride solution. In the form of the free acid, the dye has the formula

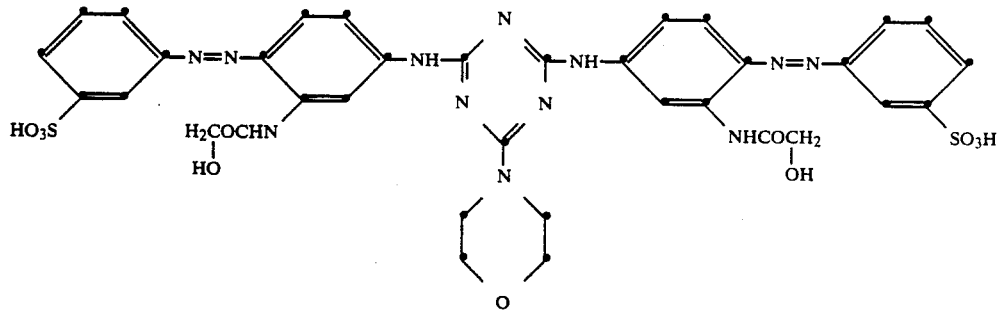

and dyes cotton in pure yellow shades which have good light fastness properties ($\lambda_{max}$ 397 nm).

It dyes cotton, paper and leather in pure yellow shades and the dyeings have good general fastness properties and in particular good light fastness ($\lambda_{max}$ 405 nm).

EXAMPLE 12

3.9 parts of 2, 4-dichloro-6-methylthio-1, 3, 5-triazine are dissolved in 70 parts of acetone, and 150 parts of ice-water are added. A suspension of 14.2 parts of 4-

EXAMPLES 13-87

Analogously to the procedure describe in Examples 1 to 3, 11 and 12, it is possible to prepare the dyes listed in Table 1, which dye cellulose materials and leather in the shade mentioned, the dyeings have good general fastness properties:

TABLE 1

| Ex. No. | Dye | $\lambda_{max}$ [nm] | Hue on cotton (bleached/merc.) |
|---|---|---|---|
| 13 | | 370 | yellow |
| 14 | | 405 | yellow |
| 15 | | 406 | yellow |

TABLE 1-continued

| Ex. No. | Dye | λ_max [nm] | Hue on cotton (bleached/merc.) |
|---|---|---|---|
| 16 | (structure) | 397/527 | orange-scarlet |
| 17 | (structure) | 384 | yellow, greenish |
| 18 | (structure) | 396/577 | green, bluish |

TABLE 1-continued
| Ex. No. | Dye | $\lambda_{max}$ [nm] | Hue on cotton (bleached/merc.) |
|---|---|---|---|
| 19 | 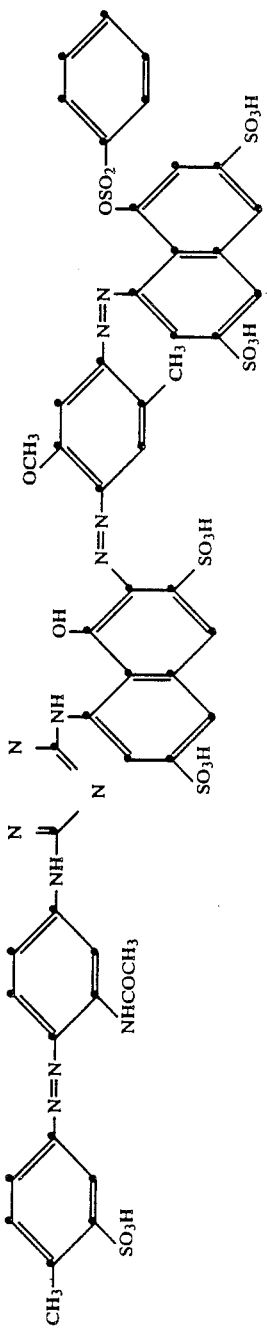 | 398/581 | green, bluish |
| 20 | 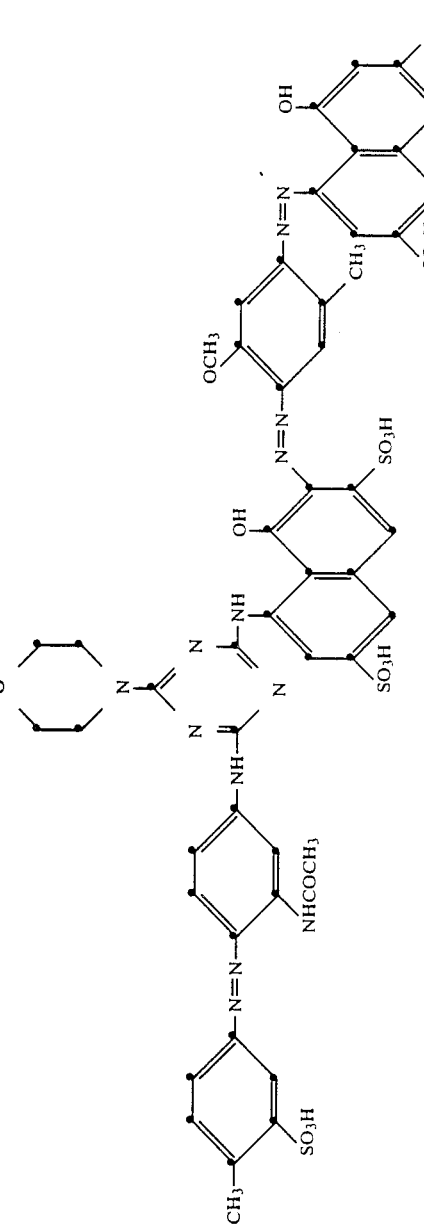 | 398/603 | green |

TABLE 1-continued

| Ex. No. | Dye | $\lambda_{max}$ [nm] | Hue on cotton (bleached/merc.) |
|---|---|---|---|
| 21 | (structure with central triazine bearing NH-phenyl, linked via two NH-N=N-azo groups to phenyl rings bearing NHCOCH₃ and SO₃H substituents) | 402 | yellow |
| 22 | (triazine with Cl substituent, linked via NH to two azo-phenyl groups bearing CH₃, SO₃H and NHCOCH₃) | 372 | yellow |
| 23 | (triazine with N(CH₂CH₂OH)₂ substituent, linked via NH to two azo-phenyl groups bearing CH₃, SO₃H and NHCOCH₃) | 407 | yellow |
| 24 | (triazine with NHCH₂COOH substituent, linked via NH to two azo-phenyl groups bearing CH₃, SO₃H and NHCOCH₃) | 381 | yellow |

TABLE 1-continued
| Ex. No. | Dye | $\lambda_{max}$ [nm] | Hue on cotton (bleached/merc.) |
|---|---|---|---|
| 25 | 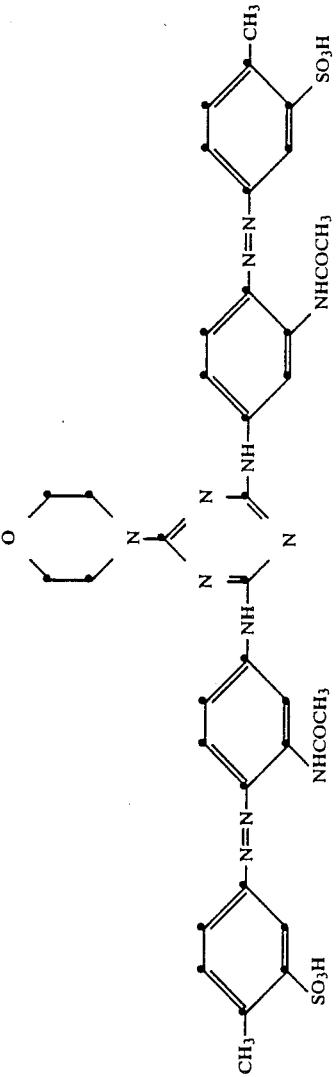 | 407 | yellow |
| 26 | 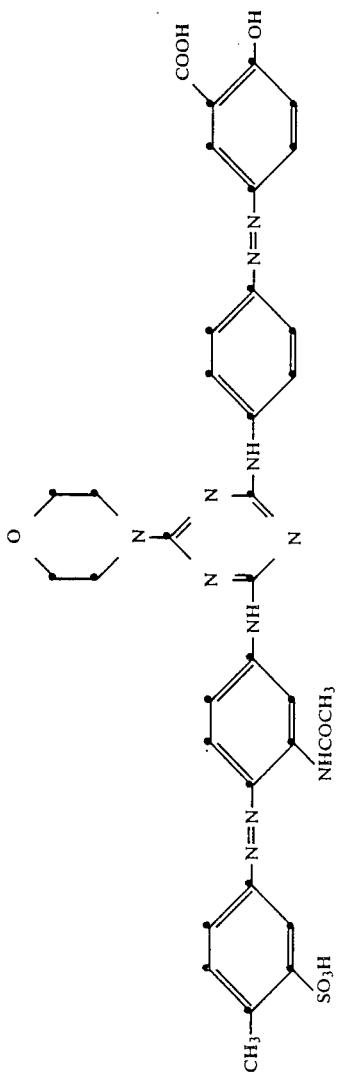 | 399 | yellow, greenish |
| 27 | 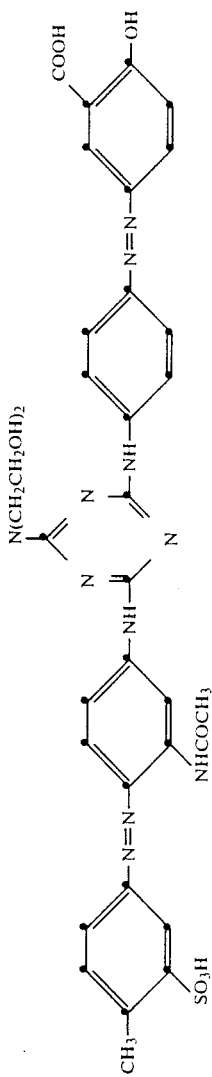 | 386 | yellow, greenish |

TABLE 1-continued
| Ex. No. | Dye | $\lambda_{max}$ [nm] | Hue on cotton (bleached/merc.) |
|---|---|---|---|
| 28 | 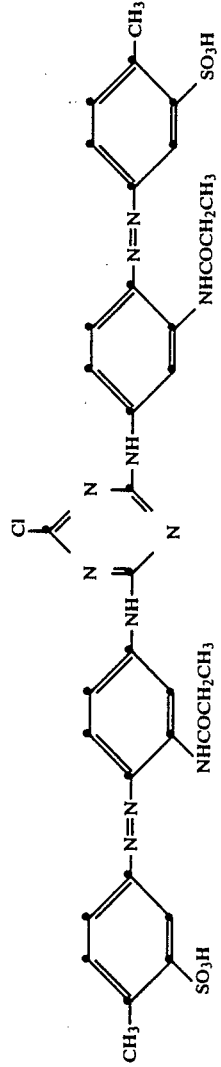 | 379 | yellow |
| 29 | 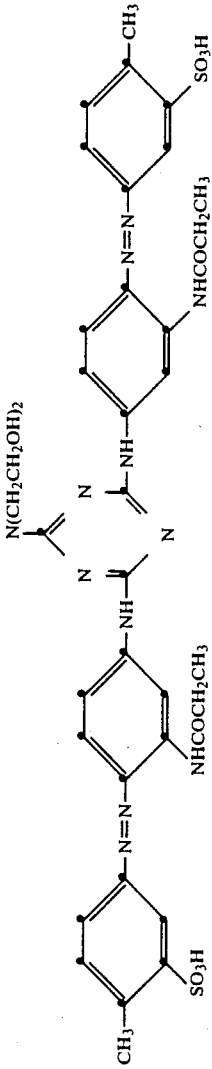 | 407 | yellow |
| 30 | 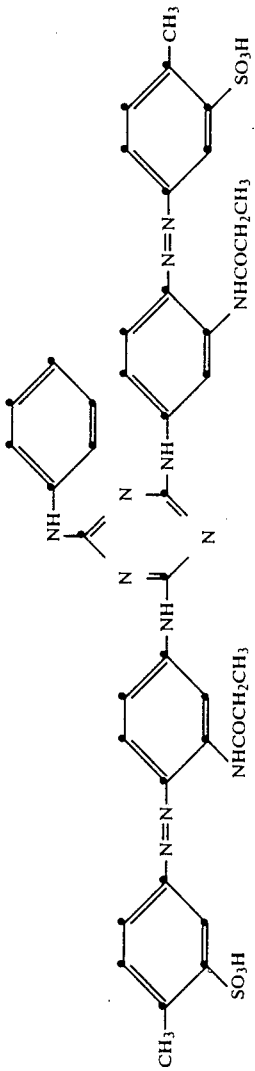 | 406 | yellow |

TABLE 1-continued

| Ex. No. | Dye | $\lambda_{max}$ [nm] | Hue on cotton (bleached/merc.) |
|---|---|---|---|
| 31 | (structure) | 412 | yellow |
| 32 | (structure) | 374 | golden-yellow |
| 33 | (structure) | 407 | golden-yellow |

TABLE 1-continued
| Ex. No. | Dye | $\lambda_{max}$ [nm] | Hue on cotton (bleached/merc.) |
|---|---|---|---|
| 34 |  | 403 | golden-yellow |
| 35 | 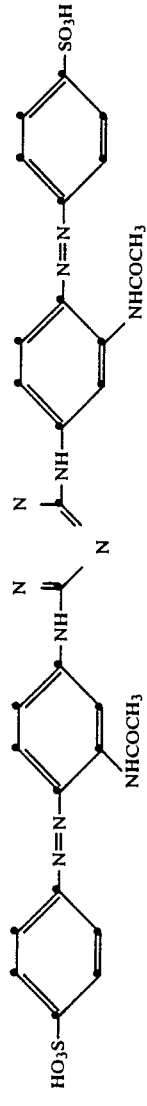 | 398 | golden-yellow |
| 36 | 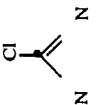 | 460 | orange-brown |
| 37 | 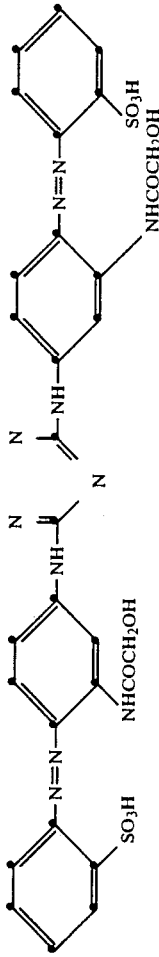 | 447 | orange-brown |

TABLE 1-continued

| Ex. No. | Dye | $\lambda_{max}$ [nm] | Hue on cotton (bleached/merc.) |
|---|---|---|---|
| 38 | | 461 | orange-brown |
| 39 | | 447 | orange-brown |
| 40 | | 382 | yellow |

TABLE 1-continued

| Ex. No. | Dye | $\lambda_{max}$ [nm] | Hue on cotton (bleached/merc.) |
|---|---|---|---|
| 41 | (structure) | 399 | yellow |
| 42 | (structure) | 372 | yellow |
| 43 | (structure) | 407 | yellow |

TABLE 1-continued
| Ex. No. | Dye | $\lambda_{max}$ [nm] | Hue on cotton (bleached/merc.) |
|---|---|---|---|
| 44 | 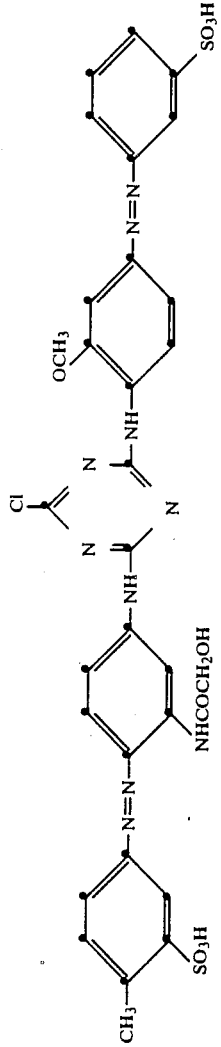 | 379 | yellow |
| 45 | 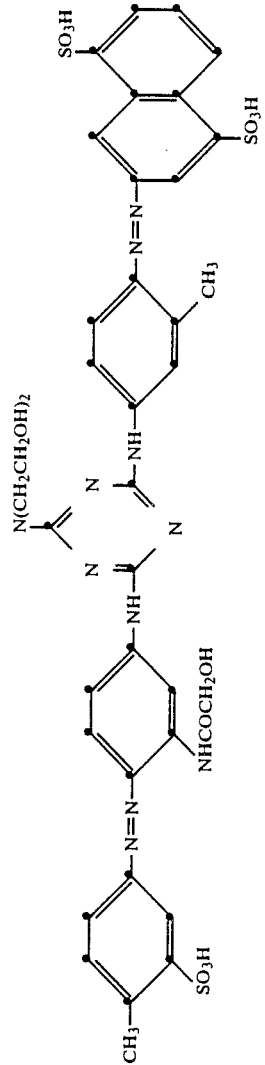 | 406 | golden-yellow |
| 46 | 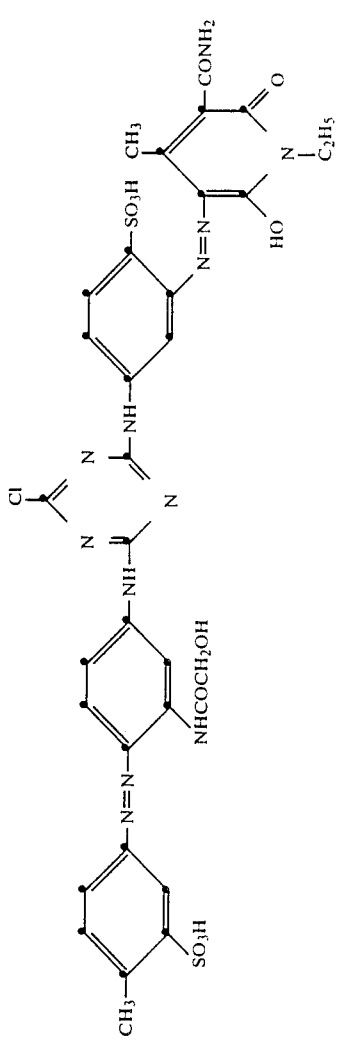 | 397 | yellow, greenish |

TABLE 1-continued

| Ex. No. | Dye | $\lambda_{max}$ [nm] | Hue on cotton (bleached/merc.) |
|---|---|---|---|
| 47 | (structure) | 401 | yellow, greenish |
| 48 | (structure) | 401 | yellow, greenish |
| 49 | (structure) | 366 | golden yellow |

TABLE 1-continued

| Ex. No. | Dye | $\lambda_{max}$ [nm] | Hue on cotton (bleached/merc.) |
|---|---|---|---|
| 50 | [structure: 4-methyl-3-sulfophenyl–N=N–(4-NHCOCH₂OH)phenyl–NH–triazine(Cl)–NH–phenyl–N=N–(2-COOH-4-OH)phenyl] | 360 | yellow, greenish |
| 51 | [structure: 4-methyl-3-sulfophenyl–N=N–(4-NHCOCH₂OH)phenyl–NH–triazine(N(CH₂CH₂OH)₂)–NH–phenyl–N=N–(2-COOH-4-OH)phenyl] | 395 | yellow, greenish |
| 52 | [structure: 4-methyl-3-sulfophenyl–N=N–(4-NHCOCH₂OH)phenyl–NH–triazine(Cl)–NH–(2-OCH₃-5-CH₃)phenyl–N=N–(2-CH₃-4-SO₃H)phenyl] | 386 | yellow |
| 53 | [structure: 4-methyl-3-sulfophenyl–N=N–(4-NHCOCH₂OH)phenyl–NH–triazine(N(CH₂CH₂OH)₂)–NH–(2-CH₃-5-OCH₃)phenyl–N=N–(2-CH₃-4-SO₃H)phenyl] | 408 | yellow |

TABLE 1-continued
| Ex. No. | Dye | $\lambda_{max}$ [nm] | Hue on cotton (bleached/merc.) |
|---|---|---|---|
| 54 | 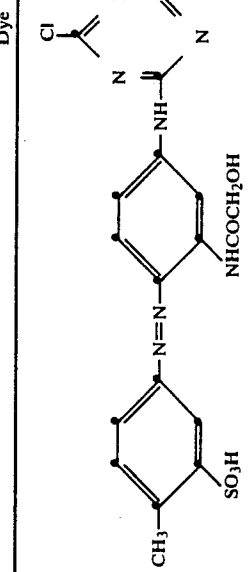 | 362 | yellow, greenish |
| 55 | 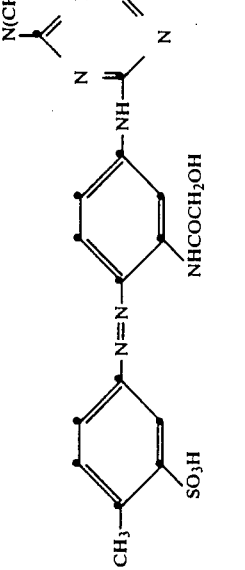 | 390 | yellow, greenish |
| 56 | 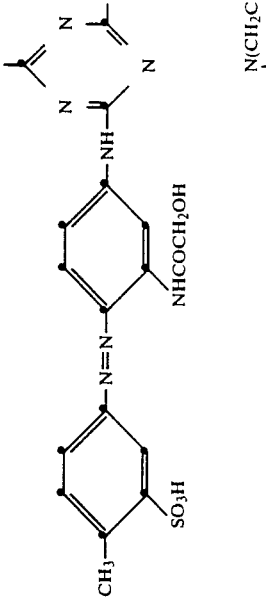 | 399/505 | brilliant orange, reddish |
| 57 | 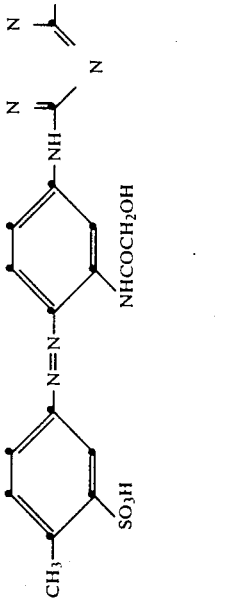 | 413/502 | brilliant orange, reddish |

TABLE 1-continued

| Ex. No. | Dye | $\lambda_{max}$ [nm] | Hue on cotton (bleached/merc.) |
|---|---|---|---|
| 58 | (structure) | 407 | yellow |
| 59 | (structure) | 403 | yellow |
| 60 | (structure) | 380 | golden-yellow |
| 61 | (structure) | 416 | golden-yellow |

TABLE 1-continued

| Ex. No. | Dye | $\lambda_{max}$ [nm] | Hue on cotton (bleached/merc.) |
|---|---|---|---|
| 62 | (structure) | 403 | golden-yellow |
| 63 | (structure) | 416 | golden-yellow |
| 64 | (structure) | 403 | yellow |

TABLE 1-continued

| Ex. No. | Dye | $\lambda_{max}$ [nm] | Hue on cotton (bleached/merc.) |
|---|---|---|---|
| 65 | (structure) | 402 | golden-yellow |
| 66 | (structure) | 362 | yellow |
| 67 | (structure) | 385 | yellow |

TABLE 1-continued

| Ex. No. | Dye | $\lambda_{max}$ [nm] | Hue on cotton (bleached/merc.) |
|---|---|---|---|
| 68 | (structure) | 422 | yellow |
| 69 | (structure) | 413 | golden-yellow |
| 70 | (structure) | 417 | golden-yellow |
| 71 | (structure) | 401 | golden yellow-orange |

TABLE 1-continued
| Ex. No. | Dye | $\lambda_{max}$ [nm] | Hue on cotton (bleached/merc.) |
|---|---|---|---|
| 72 | 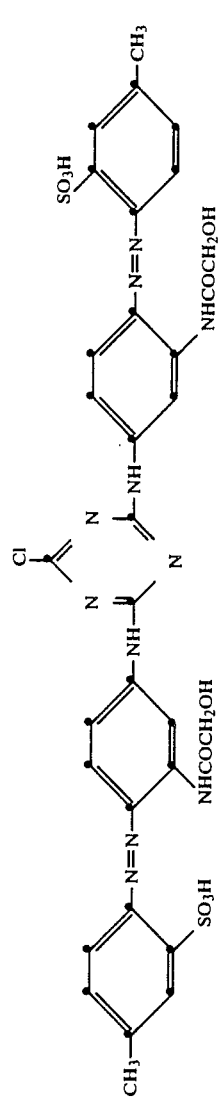 | 391 | golden-yellow |
| 73 | 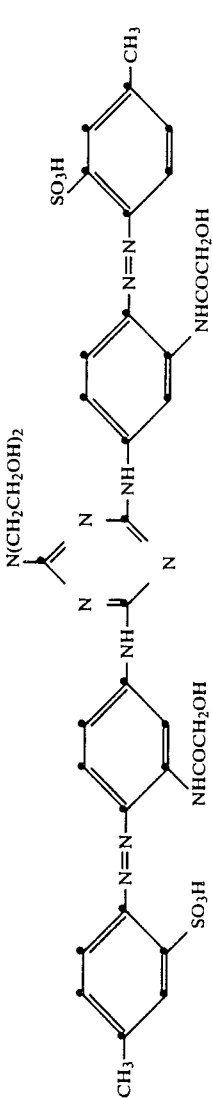 | 402 | golden-yellow |
| 74 | 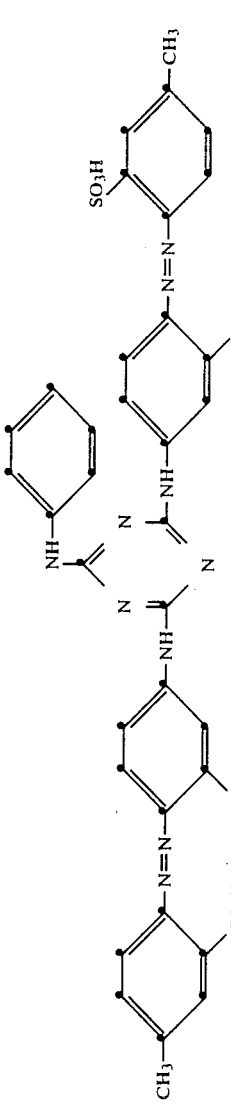 | 401 | golden-yellow |
| 75 | 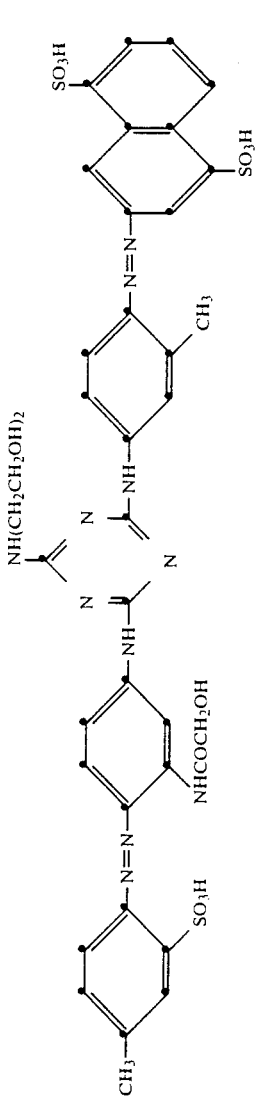 | 403 | golden-yellow |

TABLE 1-continued

| Ex. No. | Dye | $\lambda_{max}$ [nm] | Hue on cotton (bleached/merc.) |
|---|---|---|---|
| 76 | (structure) | 384 | golden-yellow |
| 77 | (structure) | 414 | golden-yellow |

TABLE 1-continued
| Ex. No. | Dye | $\lambda_{max}$ [nm] | Hue on cotton (bleached/merc.) |
|---|---|---|---|
| 78 | 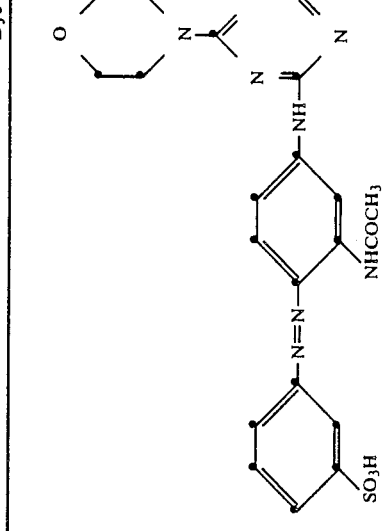 | 411 | greenish yellow |
| 79 | 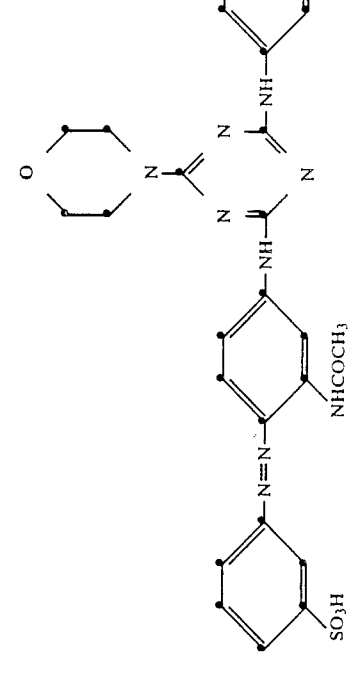 | 412/450 | orange |

TABLE 1-continued
| Ex. No. | Dye | $\lambda_{max}$ [nm] | Hue on cotton (bleached/merc.) |
|---|---|---|---|
| 80 | 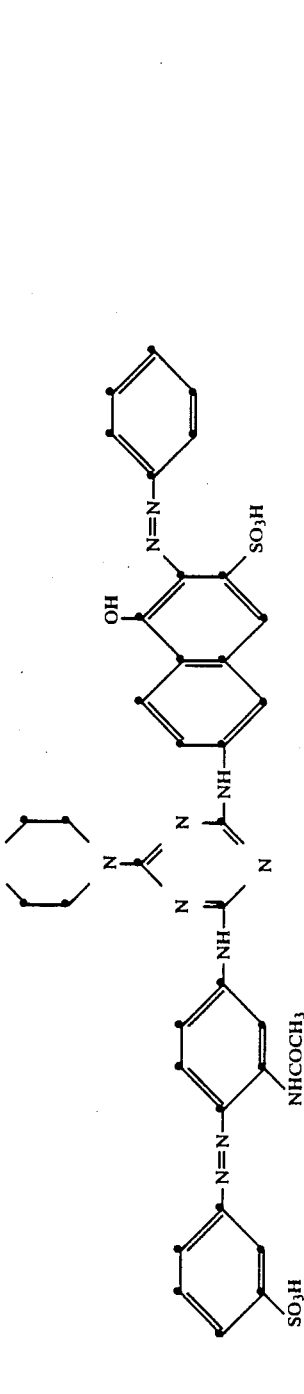 | 450 | orange |
| 81 | 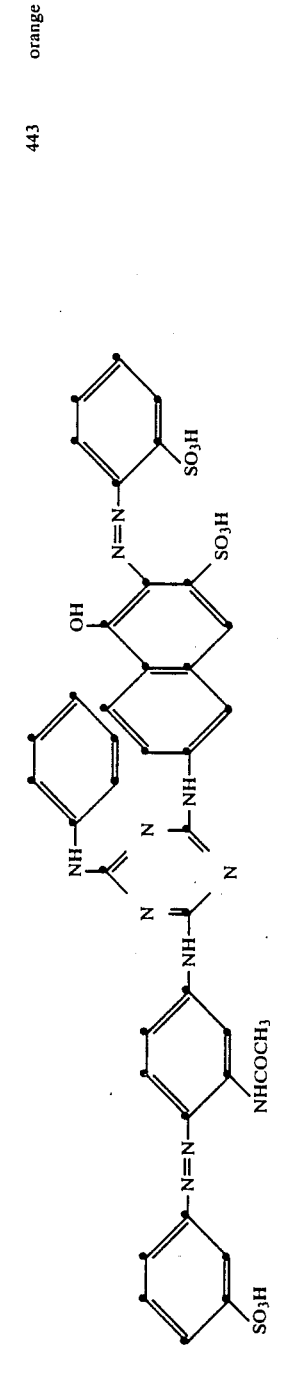 | 443 | orange |
| 82 |  | 417 | yellow |

TABLE 1-continued

| Ex. No. | Dye | $\lambda_{max}$ [nm] | Hue on cotton (bleached/merc.) |
|---|---|---|---|
| 83 | (structure with morpholine, triazine, NH bridges, azo groups, NHCOCH₂OH, SO₃H, COOH, OH substituents) | 392 | yellow, greenish |
| 84 | (structure with phenylamino, triazine, NH bridges, azo groups, NHCOCH₃, SO₃H, CH₃, OCH₃, OH, COOH, SO₃H substituents) | 412 | yellow, greenish |
| 85 | (structure with morpholine, triazine, NH bridges, azo groups, pyrazole with phenyl, CH₃, OH, SO₃H, NHCOCH₃, SO₃H substituents) | 412 | yellow, greenish |

TABLE 1-continued

| Ex. No. | Dye | λ$_{max}$ [nm] | Hue on cotton (bleached/merc.) |
|---|---|---|---|
| 86 | (morpholine-N)–C(=N)–triazine with two 4-[(3-sulfophenyl)azo]-3-(acetylamino)anilino substituents | 406 | yellow |
| 87 | (N(CH$_2$CH$_2$OH)$_2$)–C(=N)–triazine with two 4-[(3-sulfophenyl)azo]-3-(acetylamino)anilino substituents | 405 | yellow |

What is claimed is:

1. A compound of the formula

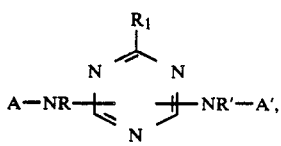

in which A is a radical of the formula

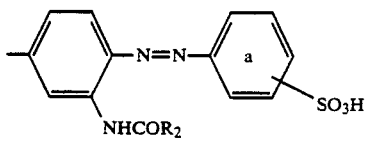

A' has the meaning of A or is a radical of the formula

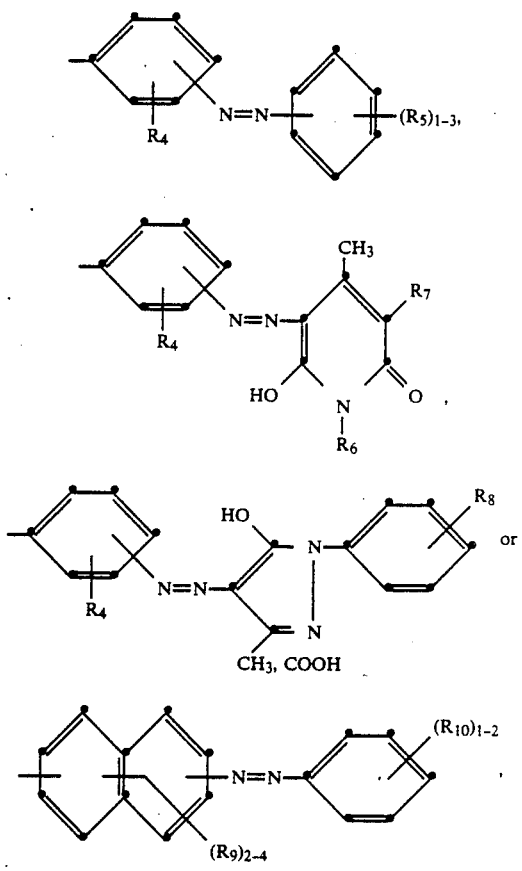

in which $R_4$ is hydrogen, methyl, methoxy, sulfo, chlorine, acetylamino, hydroxyacetylamino, propionylamino or carboxyl, $R_5$ has the meaning of 1 to 3 identical or different radicals selected from the group consisting of sulfo, methyl, methoxy, chlorine, hydroxyl, carboxyl and o-, m- or p- sulfophenylazao, $R_6$ is hydrogen, $C_1-C_4$- alkyl or $C_1-C_4$- alkoxy -$C_1-C_4$- alkyl, $R_7$ is sulfomethyl, cyano or carbamoyl, $R_8$ is methyl, methoxy, chlorine, sulfo or carboxyl, $R_9$ has the meaning of 2 to 4 identical or different substituents selected from the group consisting of hydroxyl and sulfo and $R_{10}$ has the meaning of 1 to 2 identical of different radicals selected from the group consisting of hydrogen, methyl, methoxy, sulfo, hydroxyl, amino, acetylamino and hydroxyacetylamino, R and R', independently of one another, are hydrogen or $C_1-C_4$ alkyl which is unsubstituted or substituted by chlorine, hydroxyl, cyano, carboxyl, sulfo, sulfato, methoxy, ethoxy, methoxycarbonyl or ethoxycarbonyl, $R_1$ is hydroxyl, $C_1-C_4$ alkoxy, halogen, $C_1-C_4$ alkylthio, amino, N-mono-or N, N-di-$C_1-C_4$ alkylamino which is unsubstituted or substituted in the alkyl moiety by hydroxyl, carboxyl or $C_1-C_4$ alkoxy, cyclohexylamino, phenylamino or N-$C_1-C_4$ alkyl-N-phenylamino which are unsubstituted or substituted in the phenyl moiety by $C_1-C_4$ alkyl, $C_1-C_4$ alkoxy, carboxyl, sulfo or halogen, morpholino, piperidino or 3-carboxy-3-carboxamidopyridin-1-yl, $R_2$ is unsubstituted or hydroxy-substituted $C_1-C_4$ alkyl, and the phenyl radical (a) is unsubstituted or substituted by $C_1-C_4$ alkyl, $C_1-C_4$ alkoxy, halogen, hydroxyl, carboxyl, sulfo, —NHCOR$_2$ or unsubstituted or sulfo, $C_1-C_4$ alkoxy-, hydroxyl- or halogen-substituted phenylazo or 1-2-naphthylazo.

2. A compound according to claim 1, wherein R and R' are each hydrogen.

3. A compound according to claim 1, wherein $R_1$ is N-mono- or N, N-di-$C_1-C_4$ alkylamino which is unsubstituted or substituted in the alkyl moiety by hydroxyl, carboxyl, methoxy or ethoxy, phenylamino which is unsubstituted or substituted in the phenyl moiety by chlorine, methyl, methoxy or sulfo, N-$C_1-C_4$ alkyl-N-phenylamino, $C_1-C_4$ alkylthio, chlorine, morpholino or piperidino.

4. A compound according to claim 1, wherein $R_1$ is morpholino or an N-mono- or N, N-di-$C_1-C_4$ alkylamino radical which is unsubstituted or substituted in the alkyl moiety by hydroxyl, methoxy or ethoxy.

5. A compound according to claim 4, wherein $R_1$ is morpholino or N, N-di-$\beta$-hydroxyethylamino.

6. A compound according to claim 1, wherein $R_2$ is $C_1-C_3$ alkyl which is unsubstituted or substituted by hydroxyl.

7. A compound according to claim 6, wherein $R_2$ is a methyl or hydroxymethyl radical.

8. A compound according to claim 1, wherein the phenyl radical (a) is unsubstituted or further substituted by $C_1-C_4$ alkyl, $C_1-C_4$ alkoxy, halogen, hydroxyl or carboxyl.

9. A compound according to claim 1 of the formula

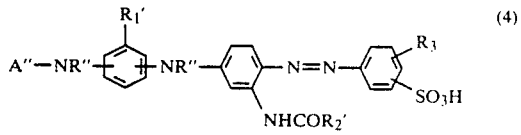

in which $R_1'$ is chlorine, orpholino, piperidino, $C_1-C_4$ alkylthio, N-$C_1-C_4$ alkyl-N-phenylamino, phenylamino which is unsubstituted or substituted by chlorine, methyl, methoxy or sulfo, N-mono-or N, N-di-substituted by chlorine, methyl, methoxy or sulfo, N-mono- or N, N-di-$C_1-C_4$ alkylamino which is unsubstituted or substituted in the alkyl moiety by hydroxyl, carboxyl, methoxy or ethoxy, $R_2'$ is $C_1-C_3$ alkyl which is unsubstituted or substituted by hydroxyl, $R_3$ is hydrogen, $C_1-C_4$ alkyl, $C_1-C_4$ alkoxy, halogen, hydroxyl or carboxyl, R″ is hydrogen, methyl or ethyl and A″ is a radical of the formula

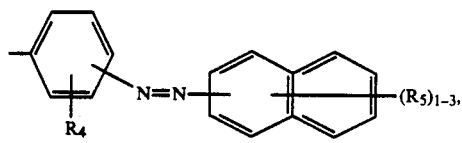

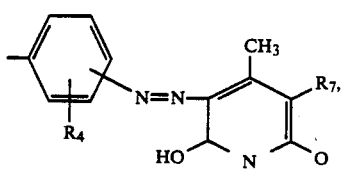

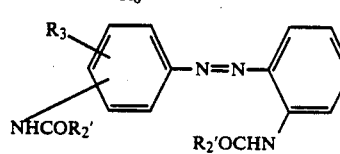 oder

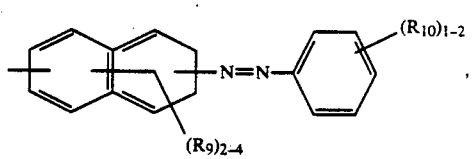

in which $R_4$ is hydrogen, methyl, methoxy, sulfo, chlorine, acetylamino, hydroxymethylamino, propionylamino or carboxyl, $R_5$ has the meaning of 1 to 3 identical or different radicals selected from the group consisting of sulfo, methyl, methoxy, chlorine, hydroxyl, carboxyl and o-, m- or p-sulfophenylazo, $R_6$ is hydrogen, $C_1$–$C_4$ alkyl or $c_1$–$C_4$ alkoxy, $C_1$–$C_4$ alkyl, $R_7$ is sulfomethyl, cyano or carbamoyl, $R_8$ is methyl, methoxy, chlorine, sulfo or carboxyl, $R_9$ has the meaning of 2 to 4 identical or different substituents selected from the group consisting of hydroxyl and sulfo and $R_{10}$ has the meaning of 1 or 2 identical or different radicals selected from the group consisting of hydrogen, methyl, methoxy, sulfo, hydroxyl, amino, acetylamino and hydroxyacetylamino.

10. A compound according to claim 1, wherein A and A′ are identical.

11. A compound according to claim 10 of the formula

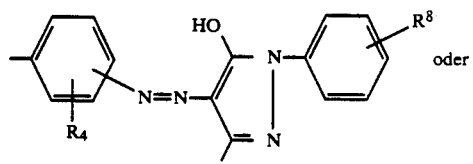 (5)

in which $R_1′$ is chlorine, morpholino, piperidino, $C_1$–$C_4$ alkylthio,, N-$C_1$–$C_4$ alkyl-N-phenylamino, phenylamino which is unsubstituted or substituted by chlorine, methyl, methoxy or sulfo, N-mono- or N, N-di-$C_1$–$C_4$ alkylamino which is unsubstituted or substituted in the alkyl moiety by hydroxyl, carboxyl, methoxy or ethoxy, $R_2′$ is $C_1$–$C_4$ alkyl, $C_1$–$C_4$ alkoxy, halogen, hydroxyl or carboxyl and R″ is hydrogen, methyl or ethyl.

12. A compound according to claim 11 of the formula (5) in which $R_1′$ is morpholino, N-hydroxy-$C_1$–$C_2$ alkylamino or N, N-dihydroxy-$C_1$–$C_2$ alkylamino, $R_2′$ is methyl, ethyl or hydroxymethyl, R″ is hydrogen and $R_3$ is hydrogen, methyl, methoxy or chlorine.

13. A compound according to claim 11 of the formula

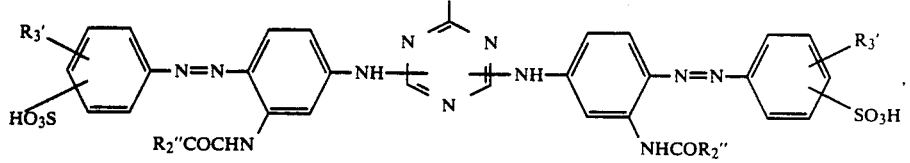 (6)

in which $R_1″$ is N, N-di-β-hydroxyethylamino or morpholino, $R_2″$ is methyl or hydroxymethyl and $R_3′$ is hydrogen, methyl or methoxy.

* * * * *